May 1, 1951 W. G. SPENCER 2,550,876
BICYCLE FORK MECHANISM
Filed June 11, 1948
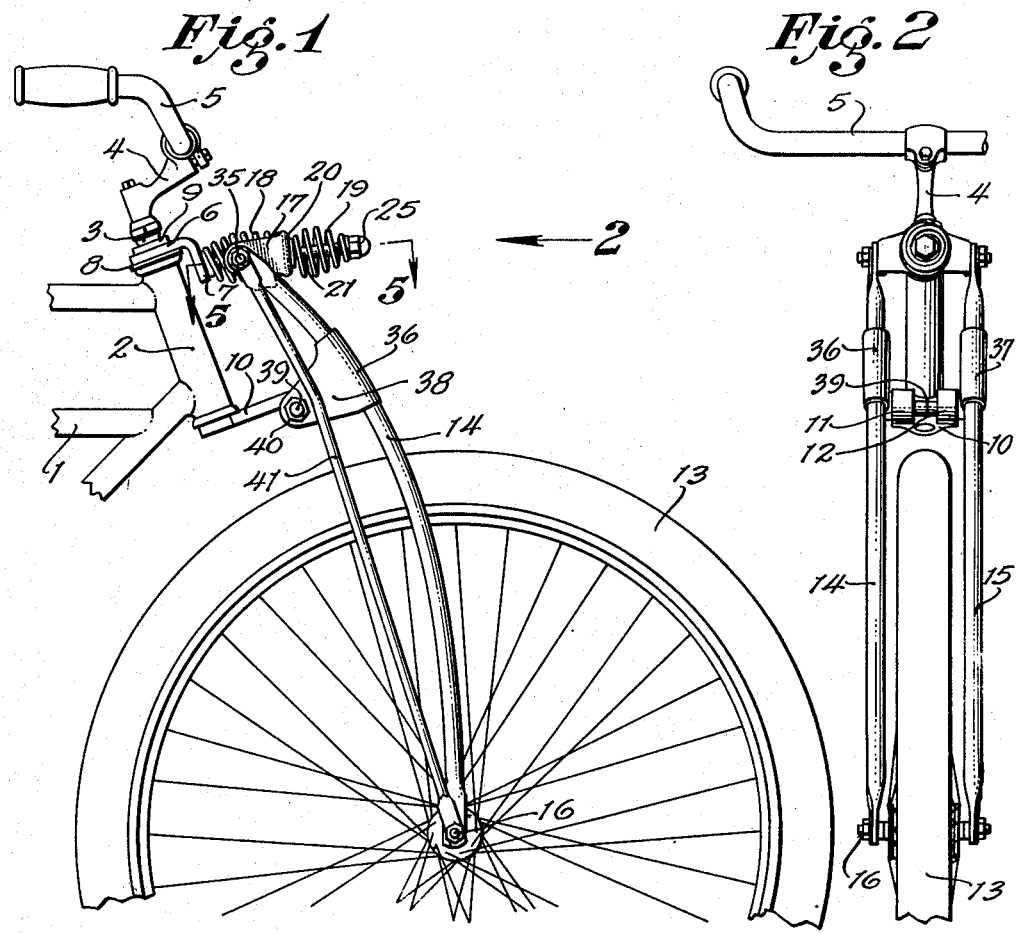
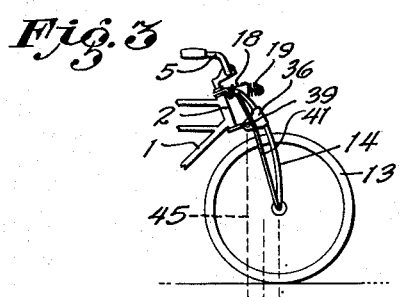
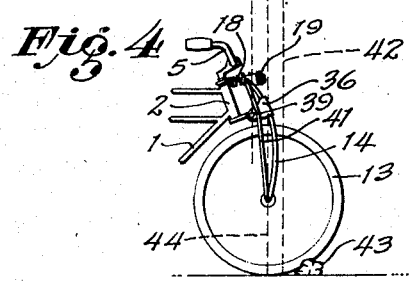
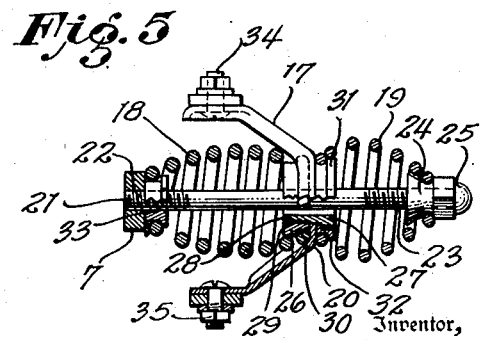
Inventor,
WILLIAM G. SPENCER
By Calvin Brown
Attorney Patented May 1, 1951

2,550,876

UNITED STATES PATENT OFFICE 2,550,876

BICYCLE FORK MECHANISM

William G. Spencer, Burbank, Calif.

Application June 11, 1948, Serial No. 32,297

1 Claim. (Cl. 280—276)

The present invention relates to improvements in fork mechanism for bicycles, and has for an object an improvement wherein the bicycle rides easier, absorbs impact without noticeable jar to the bicycle frame, which incorporates safety factors for the rider, is inexpensive in cost of manufacture, readily installed in existing bicycles, and which may be a replacement unit or constitute an initial installation, and which generally is superior to fork mechanisms now known to the inventor.

It is universal practice in bicycle construction to provide a bowed fork interconnecting the front wheel with the bicycle frame, the concavity or belly of which faces forwardly and, as a rule, this fork is directly attached to the steering tube. When the front wheel strikes an obstruction, whether it be a rock or a depression, shock is directly communicated to the frame and thence to the rider. This shock is very abrupt, for which reason, the bicycle seat is usually cradled on springs. I have found that the interposition of springs between the upper end of the fork and the front wheel does not materially aid in overcoming shock to the bicycle frame where the concavity or belly of the forks faces outwardly. Furthermore, my construction permits easy adjustment of the springs to compensate for different weights of riders.

With the above mentioned and other objects in view, the invention consists in the novel and useful provision, formation, construction, association, and relative arrangement of parts, members and features, all as shown in one embodiment in the accompanying drawing, described generally, and more particularly pointed out in the claim.

In the drawing:

Figure 1 is an enlarged fragmentary side elevation of the front end of a bicycle incorporating the invention, Figure 2 is a fragmentary view looking in the direction of the arrow 2 of Figure 1, Figure 3 is a fragmentary view, on a reduced scale, showing one position of the front wheel relative to the frame, Figure 4 is a view similar to Figure 3, the front wheel being in a moved position, and, Figure 5 is a fragmentary sectional view, on an enlarged scale, taken on the line 5—5 of Figure 1.

Referring now to the drawing, a conventional bicycle frame is shown at 1, which has a steering head 2 through which is passed a steering tube or stem, indicated at 3, one end of which tube carries a handle bar stem 4, the stem in turn supporting the handle bars 5. Carried by the steering tube is a collar 6 formed with an angularly bent lug 7. The said collar is interposed between suitable bearing washers at 8 and 9, which surround the steering tube, it being intended that the collar 6 should be fast to the steering tube. Secured to the lower end of the steering tube 3 is an arm or plate 10, which arm or plate moves as the steering tube is turned, and the outer end of which arm is provided with a spaced pair of knuckles 11 and 12 (see Figure 2).

The front wheel 13 of the bicycle has a pair of forks 14 and 15 secured at one end to the axle 16 of said wheel, while the opposite ends of the forks are secured to a yoke 17, which forms an element of means for absorbing shock when the wheel passes over obstructions on a roadway. This means includes a pair of coiled springs 18 and 19 of acorn form, which springs are positioned on opposite sides of a flattened portion 20 of yoke 17, the springs being positioned and held in working relationship to the yoke by means of an arbor or bolt 21 passed loosely through an opening in the portion 20 of the yoke and through the said springs, the said bolt being threaded at one end 22 for threaded engagement with the angular lug 7 while the opposite end of said arbor or bolt is threaded at 23 and carries a conical retainer nut 24 and a cap-type nut 25. The conical retainer nut engages the end convolution of coiled spring 19 and positioned adjacent yoke portion 20, and slidably movable relative to the arbor or bolt 21, are a pair of nuts 26 and 27, the nut 27 being externally screw-threaded at 28 for engagement with the internal threads 29 of nut 26. Nut 26 has a stepped or shouldered portion at 30 and nut 27 is shouldered or flanged at 31 and secures a Z-shaped washer 32. The Z-shaped washer is on the external surface of the part 20 of the yoke and acts to engage the inner convolution of spring 19. The inner convolution of spring 18 engages the shoulder 30 of nut 26 while the opposite end of said coil spring is held by a flanged nut 33, the said nut engaging the screw-threads 22.

Both the upper and lower ends of the forks 14 and 15 are flattened, the flattened upper ends being perforated so that said ends may be secured to the arms of the yoke by means of bolts and nuts, as indicated at 34 and 35. The forks are bowed outwardly, which is to say, the convex side of said forks faces forwardly of the bicycle frame. Each fork carries a collar 36 and 37, the said collars being spaced downwardly from the top ends of the forks. Each collar carries a lug, as shown for collar 36 at 38, and passed between the lugs of each collar is a bolt 39 which passes through the knuckles 11 and 12 of the arm or plate 10. The bolt is held against longitudinal movement in any approved manner, such as by nuts, as indicated at 40. I have found it expedient, although not necessary, to provide a pair of braces 41 extending between the axle 16 and the bolts 34 and 35 secured to the yoke.

The operation, uses and advantages of the invention just described are as follows:

When the bicycle is sustaining weight, the front wheel may assume the position shown in Figure 3 and wherein the axle of the front wheel will lie on the vertical dotted line 42. The weight load on the bicycle tends to rotate the forks about the pivot or fulcrum point therefor, which would be about the bolt 39. Thus, the tendency is to move the yoke toward the steering head 2 to compress spring 18 and tension spring 19. Tension in spring 19, as well as compression of spring 18, or vice versa, is regulated by adjusting the arbor or bolt 21 relative to threaded opening of lug 7. Thus, in viewing Figure 1, by way of example, it will be observed that the spring 18 is slightly compressed while spring 19 is in tension. If now the front wheel 13 should strike an obstruction 43, (Figure 4), the hub of the wheel will move from the position indicated by line 42 of Figure 3, to the position indicated by vertical dotted line 44, that is to say, will move rearwardly, which will compress spring 19 and tension spring 18, for the reason that the springs are held together at the yoke portion by the cooperating nuts 26 and 27, with the outer ends of said springs secured to nuts 24 and 33. Vertical dotted line 45 indicates that the fulcrum point for the forks remains in the same position before and after hitting an obstruction. After the obstruction is passed over, the axle of the wheel will lie on the dotted line 42. There is what may be termed a "wiping" or "cradling" action in the movement of the wheel from the position of Figure 3 to that of Figure 4, and back again to normal position. In other words, the "give" of the wheel is toward the rider when an obstruction is met. What actually occurs in practice is that when the wheel 13 strikes an obstruction, which would move the wheel from the position of Figure 3 to that of Figure 4, the inertia effect that normally occurs to the rider is materially dampened in that the frame of the bicycle continues to move forwardly, together with the rider, while the wheel moves backwardly and then forwardly so that the effect of impact is not noticed by the rider to any great extent. In other words, the frame of the bicycle has a forward momentum, as does the rider. This forward momentum is not stopped other than by the damping action of the springs, the wheel being allowed movement forwardly and backwardly so as to shift the position of the wheel axis relative to the frame of the bicycle. It is to be noted that the springs 18 and 19 hold the pivot 34 in alignment with the pivot 39 and the axle 16. The weight sustaining connection for the forks with the frame is through the collars 36 and 37, together with connecting lugs which are fulcrumed to the arm or plate 10 by bolt 39. Thus, there is in effect, a long lever portion which would be the portion included between the collars and the axle for the wheel and the short lever portion which is that portion included between the collars and the yoke 17. Hence, the coil springs actually balance the weight and control tendency of the forks to rotate relative to the fulcrum point.

I claim:

A unit for attachment to the steering post of a two-wheeled vehicle, comprising two arms, one adapted to be secured to an upper portion and the other to a lower portion of the steering post, a yoke loosely mounted on the upper arm, two coil springs, one on each side of the yoke, cooperating means securing proximate ends of the coils to the yoke, tensioning means for adjusting the compression of the springs and altering the over all length of both springs, a fork unit carrying the yoke at its upper end and adapted to receive a front wheel axle at its lower end, a rearwardly extending bracket secured to said fork unit, and a pivotal connection between the bracket and the lower arm, the length of the lower arm and of the bracket each being equal to about half the distance between the connection by which the fork unit carries the yoke, and the pivot of the bracket on the lower arm, and the distance from the forward end of the upper arm to the steering post being greater than the length of the lower arm to permit the front wheel axis to pass rearwardly of a transverse plane through the steering post axis when the forward spring is fully compressed, and the yoke pivot, the fork unit pivot, the top and the bottom of the steering head normally forming an approximate parallelogram in side elevation.

WILLIAM G. SPENCER.

REFERENCES CITED

The following references are of record in the file of this patent:

UNITED STATES PATENTS

| Number | Name | Date |
| --- | --- | --- |
| 1,232,912 | Glass | July 10, 1917 |
| 1,397,850 | Yoxall et al. | Nov. 22, 1921 |
| 2,160,034 | Schwinn | May 30, 1939 |

FOREIGN PATENTS

| Number | Country | Date |
| --- | --- | --- |
| 12,165 | Great Britain | A. D. 1905 |
| 387,110 | Germany | Dec. 28, 1923 |
| 227,787 | Great Britain | Aug. 19, 1924 |
| 251,731 | Great Britain | May 13, 1926 |
| 793,166 | France | Nov. 7, 1935 |